United States Patent [19]

Irikura et al.

[11] Patent Number: 4,613,024
[45] Date of Patent: Sep. 23, 1986

[54] POWER TRANSMISSION FOR WORKING VEHICLES

[75] Inventors: Koji Irikura, Nishinomiya; Keisaku Hikishima, Kobe; Koichiro Fujisaki, Ashiya, all of Japan

[73] Assignee: Kanzaki Kokyukoki Mfg. Co., Ltd., Amagasaki, Japan

[21] Appl. No.: 698,140

[22] Filed: Feb. 4, 1985

[30] Foreign Application Priority Data

Feb. 24, 1984 [JP] Japan .................................. 59-34737

[51] Int. Cl.⁴ .................... F16D 67/04; F16D 25/063; F16D 55/40
[52] U.S. Cl. ............................... 192/18 A; 192/13 R; 192/12 C; 192/85 AA
[58] Field of Search ................ 192/18 A, 13 R, 12 C, 192/70.12, 85 AA

[56] References Cited

U.S. PATENT DOCUMENTS

| 2,843,213 | 7/1958 | Schwartz | 180/53 |
|---|---|---|---|
| 2,953,941 | 9/1960 | Schwartz et al. | 74/665 |
| 3,017,941 | 1/1962 | Baker | 180/6 |
| 3,254,541 | 6/1966 | Schou | 74/360 |
| 3,425,293 | 2/1969 | Krawczyk et al. | 74/360 |
| 3,465,609 | 9/1969 | Fisher et al. | 74/360 |
| 3,747,727 | 7/1973 | Dach et al. | 192/18 A |
| 3,831,690 | 8/1974 | Yamaoka et al. | 180/6.66 |
| 3,835,971 | 9/1974 | Spanke et al. | 192/18 A |
| 4,148,382 | 4/1979 | Yamaoka et al. | 192/4 A |
| 4,223,829 | 9/1980 | Bange | 192/12 C X |
| 4,275,607 | 6/1981 | Snoy | 192/18 A X |
| 4,432,443 | 2/1984 | Sommer | 192/18 A X |

FOREIGN PATENT DOCUMENTS

| 110624 | 8/1980 | Japan . | |
| 86643 | 5/1982 | Japan | 192/12 C |
| 174748 | 10/1983 | Japan . | |

Primary Examiner—Rodney H. Bonck
Assistant Examiner—David A. Testardi

[57] ABSTRACT

A transmission shaft (62) mounting thereon fluid-operated clutch means (68) which discontinues selectively the input of power to such shaft is enclosed at one end portion thereof by a hollow cylinder (86) projected inwardly from an inner wall surface of transmission case (28) for power transmission. An annular groove (89) formed to said one end portion of shaft (62) at the outer peripheral surface thereof and communicated to the clutch means (68) via fluid path (85) in the shaft (62) is sealed by the hollow cylinder (86) so as to form an annular fluid chamber (90) which constitutes a rotary joint portion of fluid conduit line for the clutch means (68). Braking mechanism of a brake (69) associated with the clutch means (69) for braking the shaft (62) in the non-operated state of clutch is arranged within the hollow cylinder (86) by employing such cylinder as brake case. The rotary joint portion and brake (69) are thus arranged within transmission case (28) without a need of structure arranged outside the case (28).

7 Claims, 15 Drawing Figures

POWER TRANSMISSION FOR WORKING VEHICLES

FIELD OF THE INVENTION

This invention relates to a power transmission which transmits power in working vehicles for use in, by way of examples, earth-moving operation, reaping operation, article-loading operation to transport vehicles and the like.

More particularly, the present invention relates to a power transmission for working vehicles wherein fluid-operated clutch means which selectively connects and disconnects transmission path by selectively continuing and interrupting the input to a transmission shaft is mounted on said transmission shaft within a transmission case, said shaft being formed therein with fluid path for supplying and draining clutch-operating fluid, and in which brake means is provided to one end portion of the transmission shaft for braking the shaft when the clutch means is disengaged.

PRIOR ART

A fluid-operated clutch which is mounted on a transmission shaft for connecting and disconnecting transmission path rotates together with the shaft at least in the engaged state of such clutch. Accordingly, fluid path for supplying and draining clutch-operating fluid cannot be formed by a conduit directly connected to such clutch and is thus formed in the transmission shaft. Because such fluid path is displaced or rotated with the rotation of transmission shaft, it is required to provide a rotary joint portion in the fluid conduit line between the clutch and a control valve for controlling supply and drainage of clutch-operating fluid.

In the prior art transmission, such rotary joint portion is provided as shown in, for example, U.S. Pat. Nos. 2,843,213 and 3,831,690 in a fashion such that one end portion of transmission shaft having fluid-operated clutch thereon is formed at the outer peripheral surface thereof with annular groove or grooves, that the transmission shaft is equipped in transmission case so as to project such one end portion outwardly from the case, and that a seal housing or cover is placed on the one end portion of shaft and is fastened to an outer surface of transmission case so as to cover sealingly the annular groove and to communicate fluid path in the cover to the annular groove so that such groove acts as a rotary joint portion for connecting rotary fluid path and another fluid path fixed in position.

This structure according to the prior art will require to lengthen a transmission shaft so as to be projected at one end thereof outwardly from transmission case even when such shaft mounts a fluid-operated clutch means within the case at a position which is relatively remote from the inner wall surface of the transmission case. Such lengthened transmission shaft will result in not only an increase of manufacturing cost but a considerable drop of fluid pressure due to resistance against fluid-flowing applied by the inner peripheral surface of fluid path in the shaft when fluid is supplied to the clutch under pressure through the fluid path which is also lengthened together with the shaft. Further, it is not preferred to support one end of a transmission shaft mounting a fluid-operated clutch means at a position relatively remote from a wall of transmission case by such wall through bearings because the clutch means is relatively large in weight.

Next, although a transmission shaft the input of power to which is selectively interrupted by fluid-operated clutch means mounted on the shaft ought to be stopped in the non-operated state of the clutch means, frictional elements of the driving side in the clutch may cause a rotation of frictional elements of the driven side in the clutch even in the non-operated state of such clutch means due to dragging effect of lubricant oil within the clutch so that a rotation of the transmission shaft may be caused. This may cause an unexpected start of vehicle when such clutch means is disposed in the transmission path for driving the vehicle and may cause an unexpected drive of a working implement when such clutch means is disposed in the transmission path for driving such working implement. Such unexpected start or drive may cause a danger. It has thus already been proposed, as shown in, for example, U.S. Pat. No. 4,148,382, to provide at one end portion of a transmission shaft mounting fluid-operated clutch means a brake which brakes the shaft in the non-operated state of the clutch means. Such brake prevents an unexpected rotation of the transmission shaft in the non-operated state of the fluid-operated clutch means. Further, in a case where a mechanically operated clutch or speed-change mechanism which is operated by shifting a shiftable clutch member or speed-change gear is provided in the downstream of fluid-operated clutch means, such brake acts to terminate an inertial rotation of the shaft quickly be braking such shaft when the fluid-operated clutch means has been brought in its non-operated state prior to a shifting operation of the shiftable clutch member or speed-change gear so as to stop rotation of rotatable members of the clutch or speed-change mechanism including the shiftable member or gear.

In the other side, a brake of the type referred to above enlarges in size a portion of transmission case at which such brake is provided to one end of transmission shaft. In a case where such brake is provided to one end of transmission shaft in a transmission mechanism in which a rotary joint portion of fluid path is formed, as described before, by placing a fixed seal housing or cover on such one end portion of transmission shaft which portion is projected outwardly from a transmission case, a structure which is large in size is equipped on the outer surface of the transmission case. Such large structure will provide a restriction on the arrangement of another mechanisms for a working vehicle as well as a difficulty in handling transmission case for assembling same to the vehicle.

OBJECT

Accordingly, a primary object of the present invention is to provide a novel power transmission of the type set forth at the beginning in which a transmission shaft mounting fluid-operated clutch means is not required to be lengthened excessively for forming a rotary joint portion of fluid path and in which a brake of the type referred to before does not provide a structure to be equipped on the outer surface of a transmission case.

Another object of the present invention is to provide a power transmission for working vehicles in which a novel structure for achieving the primary object is incorporated in a fashion such that a transmission shaft mounting thereon a fluid-operated clutch means which is relatively large in weight can be supported in a stable manner.

A further object of the present invention is to provide an improved power transmission for working vehicles in which a novel structure for achieving the primary object is incorporated in a fashion such that mechanisms for operating fluid-operated clutch means and the brake, particularly mechanism for supplying and draining clutch-operating fluid, can be simplified in structure.

SUMMARY OF THE INVENTION

For achieving these objects, there is provided according to the present invention a power transmission for working vehicles wherein at least one fluid-operated clutch which selectively connects and disconnects transmission path by electively continuing and interrupting the input of power to a transmission shaft is mounted on said transmission shaft within a transmission case, said shaft being formed therein with fluid path for supplying and draining clutch-operating fluid, and in which a brake is provided to one end portion of said transmission shaft for braking the shaft in the non-operated state of said fluid-operated clutch, characterized in that a hollow cylinder which projects inwardly from an inner wall surface of said transmission case and encloses said one end portion of the transmission shaft is formed integrally with said transmission case, said one end portion of the transmission shaft having at the outer peripheral surface thereof an annular groove communicated to said fluid path and said annular groove being sealed by the inner peripheral surface of said hollow cylinder so as to form an annular fluid chamber between said shaft and cylinder, that a fluid path for connecting said fluid-operated clutch to a control valve for controlling supply and drainage of clutch-operating fluid is formed in said hollow cylinder and is communicated to said annular fluid chamber so as to provide a rotary joint portion of fluid conduit line for said fluid-operated clutch by said annular fluid chamber, and that braking mechanism of said brake is arranged within said hollow cylinder by employing the cylinder as a brake case therefor.

In the power transmission according to the present invention, the annular fluid chamber set forth above which constitutes rotary joint portion of fluid conduit line for the fluid-operated clutch is disposed within the hollow cylinder projected inwardly into the transmission case from an inner wall surface of the case so that such annular fluid chamber takes within the transmission case a position which is as near as possible to the fluid-operated clutch. The transmission shaft mounting the fluid-operated clutch may have a length enough to project at the one end portion thereof into the hollow cylinder which is positioned within the transmission case, whereby such transmission shaft may be reduced in length. Cost occupied by such shaft may thus be reduced and also drop in pressure of clutch-operating fluid flowing through fluid path in the shaft under pressure is made small.

The brake constructed by employing the hollow cylinder which projects inwardly from an inner wall surface of transmission case does not require a structure which projects outwardly from an outer surface of the transmission case. Owing to this and also owing to omission of a seal housing or cover on the outer surface of transmission case which cover has been employed in the conventional power transmission of the type in question, transmission case for the power transmission according to the present invention largely reduces problems such that such case provides a restriction on the arrangement of other mechanisms of a working vehicle and also a difficulty in handling such case for assembling same to a vehicle.

One end portion of transmission shaft mounting thereon at least one fluid-operated clutch may be supported by the hollow cylinder which is provided in the fashion set forth before. When one end portion of the shaft is supported in this fashion, such one end portion of transmission shaft having thereon fluid-operated clutch means which is relatively large in weight is supported at a position which is very near to the clutch means. By this, the transmission shaft is supported in a stable manner so that there is no necessity of excessively enlarging diameter of such shaft for preventing deflection thereof which may be caused when one end portion of transmission shaft is supported at a position relatively far from fluid-operated clutch means.

In an aspect of the present invention, bearing means for receiving such one end portion of transmission shaft is thus supported by the innermost end portion of hollow cylinder which is provided in the fashion set forth before. Such innermost end portion of the hollow cylinder supports the transmission shaft through bearing means at a position nearest to the fluid-operated clutch means so that the shaft is supported in a very stable manner.

A collar on which the bearing means set forth above abutts at the inner end face thereof is provided in another aspect of the present invention by a collar portion which is formed integrally with clutch case for the fluid-operated clutch. This reduces number of parts constituting the transmission and, thus, makes assemblage of the transmission easier. Further, the collar portion set forth above enlarges area of contact between the clutch case and transmission shaft along their axial direction so that the clutch case which is fixedly mounted on the transmission shaft is supported in a stable manner.

In a further aspect of the present invention, the hollow cylinder set forth before is shaped such that it opens at the outside of transmission case and opening of such hollow cylinder is closed by a cover which is fixedly secured to an outer surface of transmission case. This structure contributes to an easier assembling of braking mechanism into the hollow cylinder.

In addition to such structure for an easier assembling of braking mechanism, the brake for braking transmission shaft in the non-operated state of fluid-operated clutch means is fashioned according to an embodiment of the present invention such that it comprises frictional braking means, a piston which is faced to the frictional braking means from the side of the cover closing the opening of hollow cylinder, spring means which is received at the base end thereof by the cover and is engaged at the other end thereof to the piston for biasing the frictional braking means through the piston so as to cause a braking operation of the frictional braking means, and a fluid chamber for applying fluid pressure to the piston from a direction opposite to the biasing direction by the spring means, the fluid chamber being connected to the fluid path which is formed in the hollow cylinder for connecting the annular fluid chamber forming a rotary joint portion of fluid conduit line to the control valve for fluid-operated clutch means. This frictional brake which may be assembled into the hollow cylinder with ease releases braking of the transmission shaft so as to permit a free rotation of the shaft in the operated state of fluid-operated clutch means where pressure of fluid supplied to the clutch means under pressure is applied to the fluid chamber in the brake so as to move the piston against the biasing force of spring means, whereas the brake operates to brake the transmission shaft in the non-operated state of fluid-operated clutch means where pressure of clutch-operating fluid is released from the clutch means as well as the fluid chamber in the brake to cause a braking operation of the frictional braking means by the biasing force of spring means. Such frictional brake is simple in its operating mechanism, because it is operated by a mechanism for supplying and draining fluid to the fluid-operated clutch means.

It is preferred that the frictional brake is made a brake of multi-disk type for depressing generation of heat in the brake as well as for reducing wear of the frictional braking means. The brake employed in the power transmission according to the present invention is constructed by employing the hollow cylinder located within transmission case as a brake case so that number of frictional disks or plates may be increased within a limit determined by the length of such brake case without any additional structure onto the outer surface of transmission case, that is not expected in the conventional transmission in which brake case is arranged on an outer surface of transmission case. The frictional braking means for the brake is thus fashioned according to a further embodiment of the present invention such that it comprises a plurality of frictional plates members which are slidably but non-rotatably supported at their inner peripheral ends by the transmission shaft and a plurality of another frictional plate members which are slidably but non-rotatably supported at their outer peripheral ends by the hollow cylinder. The hollow cylinder is formed at the inner peripheral surface thereof with an annular reaction area which is faced to the piston via the series of such frictional plate members.

The frictional brake can be made simple in its operating mechanism by utilizing for its operation fluid-supplying and—draining mechanism for the clutch, as described before, not only in the case where the brake is of multi-disk type set forth above but also in the case where the brake is of single-disk type. For the purpose of simplifying further the operating mechanism for clutch and brake, an embodiment of the present invention is fashioned, in the structure of providing fluid chamber for the frictional brake in the hollow cylinder including therein a rotary joint portion for clutch-operating fluid conduit line, such that a valve housing which projects inwardly from the inner wall surface of transmission case and is integral with the hollow cylinder is formed integrally with transmission case and such that the control valve for fluid-operated clutch means is included in such valve housing so that the fluid path for connecting the annular fluid chamber constituting a rotary joint portion of fluid conduit line to such control valve may be formed in the valve housing and hollow cylinder. This embodiment makes the structure for forming fluid conduit line between the control valve and annular fluid chamber constituting the rotary joint portion as well as fluid chamber for the brake, because no piping is required between the valve and two kinds of fluid chambers. Further, fluid path between the valve and two chambers is reduced in length so that drop of fluid pressure in such fluid path is effectively reduced. The valve housing eliminates another valve housing which is to be equipped on an outer surface of transmission case as an outwardly projected structure.

In forming such valve housing, the transmission shaft mounting fluid-operated clutch means is arranged according to a further embodiment of the present invention in an offset position along a direction across the transmission case. In addition to this arrangement of transmission shaft, the valve housing is connected integrally with the inner wall surface of transmission case as well as with one of the two opposite inner wall surfaces of transmission case perpendicular to the former inner wall surface which one is positioned nearer to the transmission shaft than the other of the two opposite inner wall surfaces. By this, the hollow cylinder and valve housing may be formed within the transmission case at a corner portion of such case in a compact fashion such that they provides little restriction on the arrangement of another mechanisms within the transmission case.

Another features of the present invention and its attendant advantages will become readily apparent from the descriptions of the embodiment shown in the drawings which will be detailed later.

Although such embodiment relates to a power transmission of PTO (power take-off) system for driving working implements in a working vehicle, the present invention may, of course, be embodied as a power transmission of vehicle-travelling or -driving system. Further, although the embodiment shown in the drawings relates to a power transmission in which only one fluid-operated clutch is provided on a transmission shaft, the present invention may also be embodied as a transmission having two or more fluid-operated clutches on a transmission shaft.

DESCRIPTION OF A PREFERRED EMBODIMENT

Vehicle Structure

Figure 1:
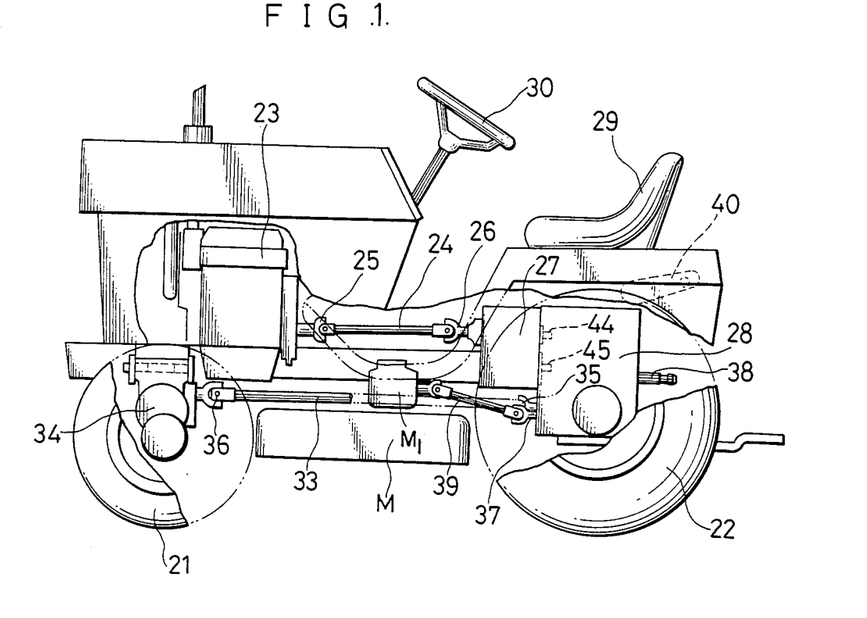
FIG. 1 is a schematic side view, partially cut away, of a working vehicle in which an embodiment of the present invention is employed.
Figure 2:
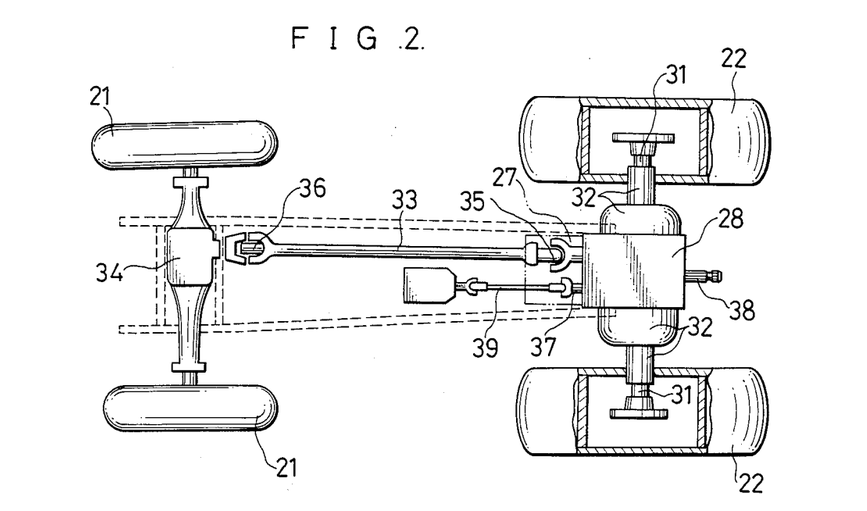
FIG. 2 is a schematic plan view showing arrangement of various components of the vehicle shown in FIG. 1.

FIG. 1 shows schematically the whole of a working vehicle in which an embodiment of the power transmission according to the present invention is employed, and FIG. 2 shows schematically arrangement of various components of such working vehicle.

The working vehicle which is shown as a tractor of relatively small size is equipped with a mower M of mid-count type between a pair of front wheels 21 and a pair of rear wheels 22. Engine 23 is mounted on a front portion of the vehicle. Transmission mechanism to which power is fed by the engine 23 through transmission shaft 24 having at their ends flexible joints 25 and 26 is arranged at a rear end portion of the vehicle and between the left and right rear wheels 22. This transmission mechanism comprises hydrostatic transmission 27 disposed at a fronter side of transmission mechanism and transmission in a transmission case 28 disposed at a rearer side of transmission mechanism. Power is transmitted from transmission shaft 24 to hydrostatic transmission 27 and then from hydrostatic transmission 27 into transmission case 28. Seat 29 is equipped at an upper position of rear end portion of the vehicle frame. As is conventional, the vehicle is steered by an operator on the seat 29 by means of steering handle 30 for providing a turn of the left and right front wheels 21.

The working vehicle shown is constructed as a four-wheeled tractor which is travelled by driving rear wheels 22 and, when preferred or required, by also driving front wheels 21. For driving rear wheels 22, left and right axle housing 32 supporting the left and right rear wheel axles 31 are fixely secured to transmission case 28 so that power is transmitted from the inside of transmission case 28 directly to the left and right axles 31. For a selective drive of front wheels 21, a transmission shaft 33 is provided which transmits power from a lower portion of the inside of transmission case 28 into front axle case 34 disposed between left and right front wheels 21. This shaft 33 is driven to rotate through a front wheel-driving clutch, which is arranged in transmission case 28 as will be detailed later, and comprises flexible joints 35 and 36 at both ends.

As PTO (power take-off) shafts for driving working implements which are equipped selectively to the vehicle for various working purposes, there are provided a mid-PTO shaft 37 which extends forwardly at a low level from the inside of transmission case 28 and a rear-PTO shaft 38 which extends rearwardly at a mid level from the inside of transmission case 28. Mid-PTO shaft 37 shown is fashioned such that it transmits power to a gear box $M_1$ for driving the mower M through a transmission shaft 39 having flexible joints at both ends. On the upper of transmission case 28 is arranged a hydraulic lift mechanism which comprises a pair of left and right lift arms 40 shown in FIG. 1. Rear-PTO shaft 38 is used for driving working implements such as mower, rotary tiller etc. which are selectively connected to the rear end of vehicle by means of link mechanism not shown in the drawings so as to be drawn by the vehicle and which are selectively lifted and lowered by the hydraulic lift mechanism referred to above.

General Structure of Transmission Mechanism

Figure 3:
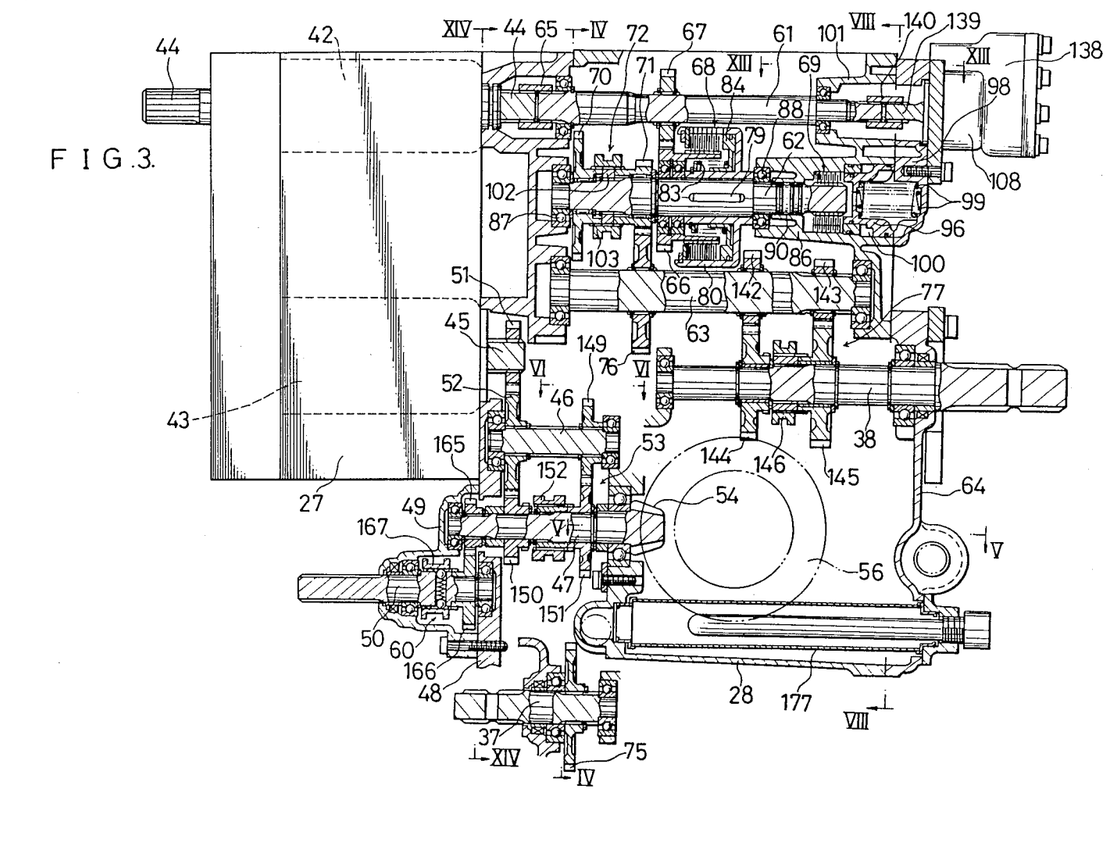
FIG. 3 is a side elevational view of hydrostatic transmission and transmission in transmission case employed in the vehicle shown in FIG. 1, showing the transmission in the transmission case in section and in partially developed form.
Figure 4:
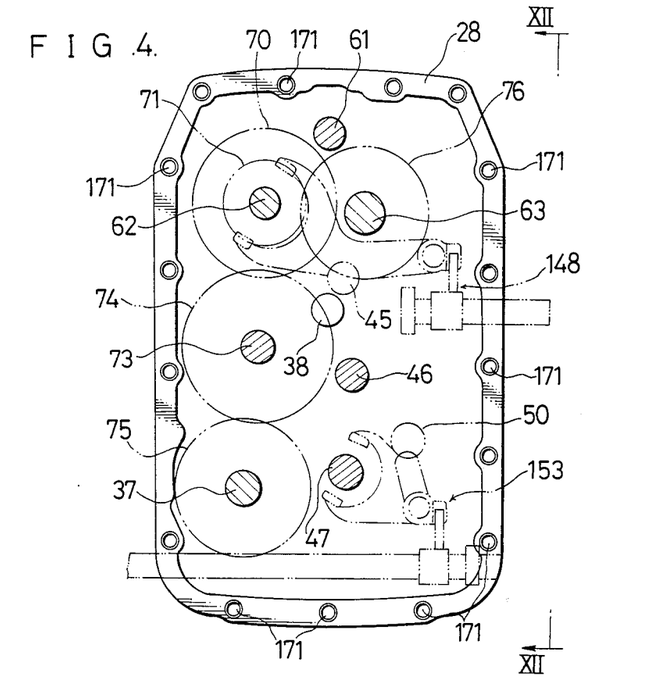
FIG. 4 is a sectional front view, partially omitted, taken along line IV—IV of FIG. 3, showing arrangement of transmission shafts and some of the gear trains provided in the transmission case shown in FIG. 3.

FIG. 3 shows the hydrostatic transmission 27 and a vertical section, partially developed, of the transmission case 28, and FIG. 4 shows arrangement of transmission shafts in the transmission case 28.

As shown in FIG. 3, hydrostatic transmission 27 comprises hydraulic pump 42 of variable displacement type and hydraulic motor 43 of fixed displacement type which are arranged in parallel by placing the pump 42 at the upper side. Pump shaft 44 of hydraulic pump 42 is connected at the front end thereof to the flexible joint 26 shown in FIG. 1 and is projected at the rear end portion into transmission case 28 so as to use it as an input shaft for transmission of PTO-line in the case 28. Motor shaft 45 of hydraulic motor 43 which is driven to rotate by hydraulic pump 42 at variable speed of rotation with a selective reverse of direction of rotation is projected at the rear end portion thereof into transmission case 28 so as to use it as an input shaft for transmission of vehicle-travelling power in the case 28.

As shown in FIGS. 3 and 4, there are provided in the transmission case 28 as transmission shafts for vehicle-travelling power forwardly and backwardly extending motor shaft 45, intermediate shaft 46 and speed-change shaft 47 which are arranged from the upward to the downward in that order at an approximately middle portion of the width of transmission case 28. To the front of transmission case 28 is fixedly secured a frame plate 48 to which is fixedly secured at the front of its lower portion a clutch case 49 for front wheel-driving clutch. Intermediate shaft 46 is rotatably supported by the frame plate 48 and a supporting wall projected from an inner wall of the case 28, whereas speed-change shaft 47 is rotatably supported by the clutch case 49 and supporting wall both referred to above. These shafts 46 and 47 are disposed at the front end portion of the inside of transmission case 28. An output shaft 50 for front wheel-driving power which extends along the forward and backward direction is rotatably supported by the clutch case 49 and frame plate 48 and is projected fowardly from the transmission case 28. This output shaft 50 is connected to the transmission shaft 33 shown in FIGS. 1 and 2.

Figure 5:
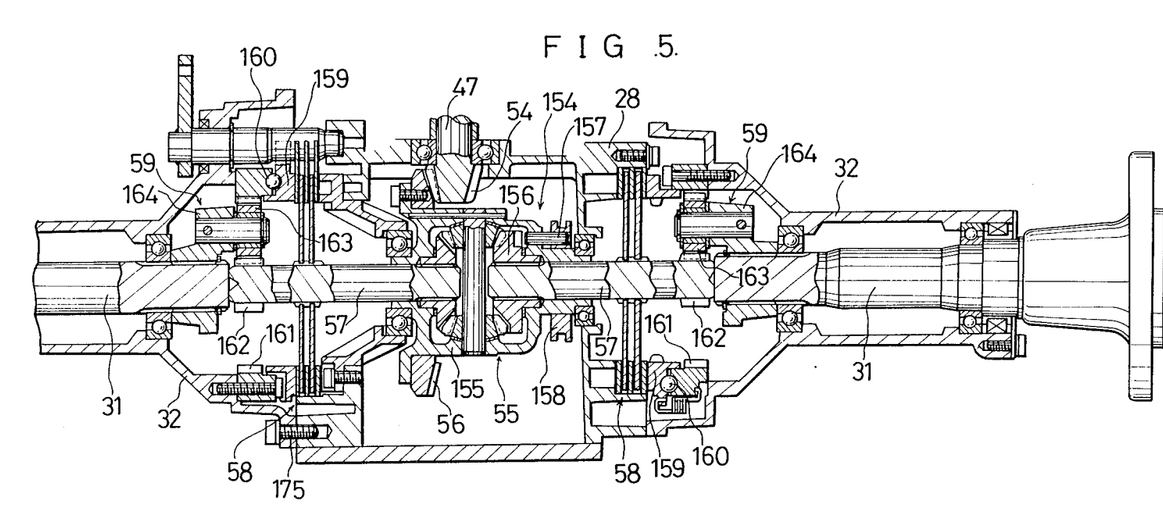
FIG. 5 is a cross-sectional plan view, partially omitted, taken along line V—V of FIG. 3.

Motor shaft 45 and intermediate shaft 46 are operatively connected with each other by meshing gears 51 and 52 fixedly mounted on these shafts. Between intermediate shaft 46 and speed-change shaft 47 is disposed a speed-change gearing 53 through which speed-change shaft 47 is driven to rotate at stepwisely variable speed of rotation. Rear end portion of speed-change shaft 47 is formed with an integral bevel gear 54 of a small size which is meshed with input bevel gear 56 of a large size for a differential gearing 55 which is shown in detail in FIG. 5. As shown in FIG. 5, the left and right rear wheel axles 31 are arranged coaxially with left and right output shafts 57 of the differential gearing 55 and each of the output shafts 57 is operatively connected to each of the rear wheel axles 31 through a disk brake 58 and speed-reduction planetary gearing 59 which are disposed within each of the axle housings 32 at the base end portion of such housing. Meanwhile, a front wheel-driving clutch 60 for selectively connecting the output shaft 50 operatively to speed-change shaft 47 is arranged, as shown in FIG. 4, in the clutch case 49 referred to before.

As shown in FIGS. 3 and 4, there are provided in the transmission case 28 as transmission shafts for PTO-line forwardly and backwardly extending one and another transmission shafts 61 and 62 and intermediate shaft 63 each of which has a relatively large length. These shafts are positioned at a high level portion in the case 28 and transmission shaft 61 is disposed coaxially with the pump shaft 44, whereas another transmission shaft 62 and intermediate shaft 63 are disposed below transmission shaft 61 in a fashion such that these shafts 62 and 63 are separated from each other in a direction across the case 28. The mid-PTO shaft 37 is rotatably supported by the frame plate 48 and supporting wall projected from an inner wall of transmission case 28 and is arrange at a low level portion in the case 28 in a fashion such that this shaft 37 is disposed opposite to the output shaft 50 with the speed-change shaft 47 between. The rear-PTO shaft 38 is rotatably supported by a supportng wall projected from an inner wall of transmission case 28 and a cover plate 64 on the rear of the case 28 and is arranged at a mid level in the transmission case 28 in a fashion such that this shaft 38 is disposed between and below the shafts 62 and 63 and extends backwardly from an intermediate position of the inside of transmission case 28.

Figure 6:
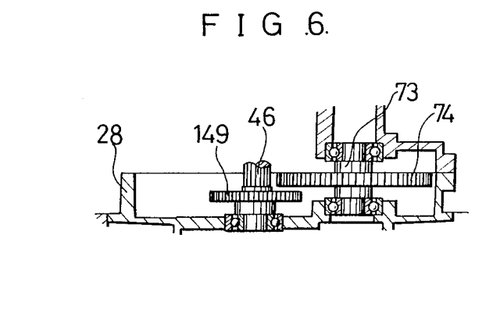
FIG. 6 is a cross-sectional plan view taken along line VI—VI of FIG. 3.

As shown in FIG. 3, transmission shaft 61 is fixedly connected to the motor shaft 44 by means of coupling 65. A gear 66 meshed with another gear 67 which is fixedly mounted on transmission shaft 61 is rotatably mounted on another transmission shaft 62. On the transmission shaft 62 is mounted a fluid-operated clutch 68 which when operated connects gear 66 to transmission shaft 62 so as to connect operatively the two transmission shafts 61 and 62. To this fluid-operated clutch 68 is annexed a brake 69 for braking the transmission shaft 62 in the non-operated state of clutch 68, as will be detailed later. In front of fluid-operated clutch 68, a pair of spaced gears 70 and 71 are rotatably mounted on transmission shaft 62. Between these gears 70 and 71 is provided on the shaft 62 PTO-exchanging clutch 72 for selectively connecting gears 70 and 71 to transmission shaft 62. As shown in FIGS. 4 and 6, idler shaft 73 of a small length which is rotatably supported by transmission case 28 through a pair of bearings is arranged in the case 28 at a mid level between transmission shaft 62 and mid-PTO shaft 37. Among the pair of gears 70 and 71 on the shaft 62, gear 70 having a larger diameter is operatively connected to mid-PTO shaft 37 through an intermediate gear 74 which is fixedly mounted on the idler shaft 73 and is meshed with the gear 70 and also the gear 75 fixedly mounted on the mid-PTO shaft 37. Another gear 71 on the shaft 62 is meshed with a gear 76 which is fixedly mounted on the intermediate shaft 63. As shown in FIG. 3, rear-PTO speed-change gearing 77 is disposed between intermediate shaft 63 and rear-PTO shaft 38. Intermediate shaft 63 drives rear-PTO shaft 38 to rotate through such speed-change gearing 77 with stepwisely variable speed of rotation.

PTO-clutch Mechanism

Figure 7:
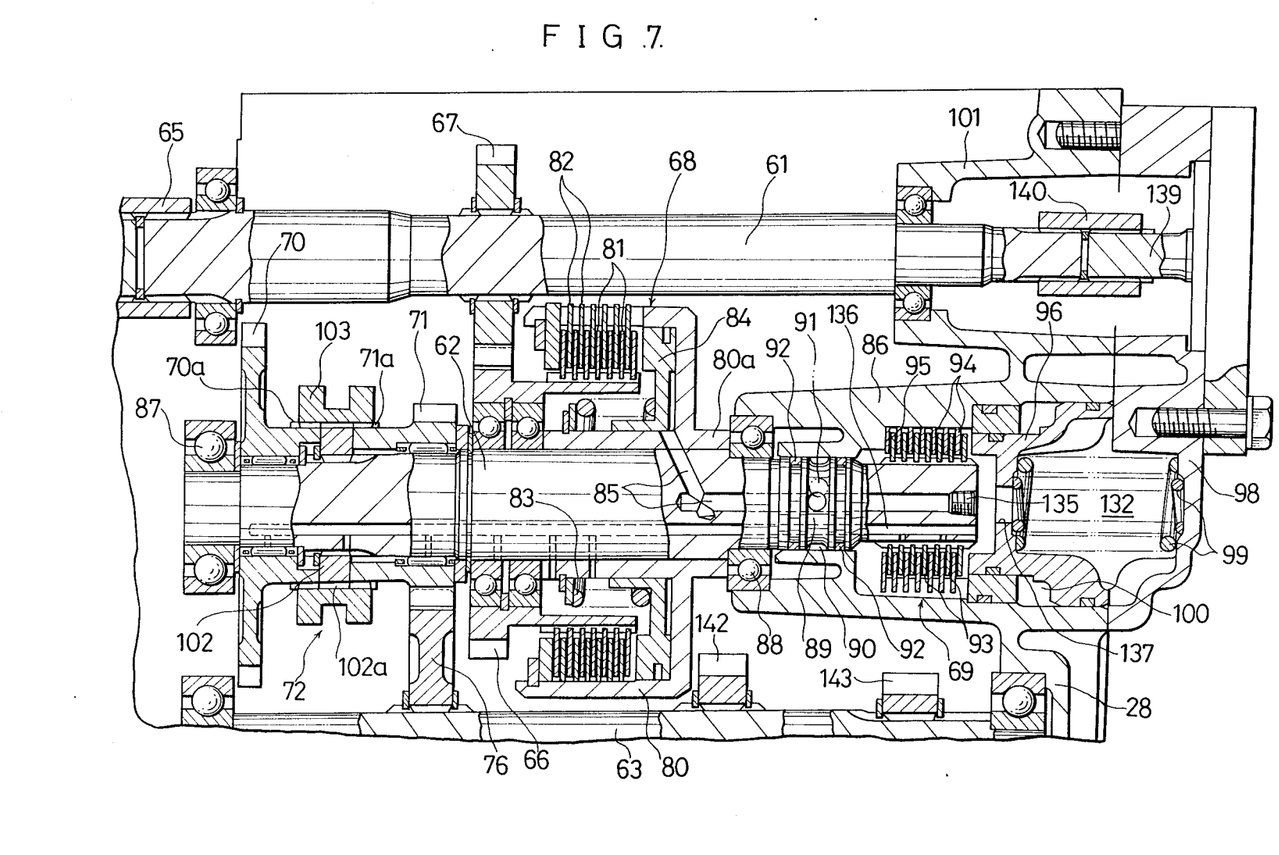
FIG. 7 is an enlarged sectional side view of a part of the transmission in transmission case shown in FIG. 3.

FIG. 7 shows in detail PTO-clutch mechanism which comprises fluid-operated clutch 68, brake 69 and PTO-exchanging clutch 72.

Fluid-operated clutch 68 comprises a clutch case 80 which is fixedly mounted on the transmission shaft 62 by using a key 79 shown in FIG. 3. This clutch 68 is of multi-disk type in which a plurality of one and another frictional elements 81 and 82 are slidably but non-rotatably supported by the gear 66 and clutch case 80, respectively. In the clutch case 80 is arranged a piston 84 which is biased by return spring 83 to move away from frictional elements 81 and 82. As is conventional, clutch 68 is operated by a supply of fluid under pressure through a fluid path 85 formed in transmission shaft 62 so as to advance the piston 84 to cause a frictional engagement between the frictional elements 81 and 82.

As clearly shown in FIG. 7, rear wall of transmission case 28 is particularly formed with an integral hollow cylinder 86 which projects into the case 28 from the inner surface of rear wall of the case 28 and encloses a rear end portion of transmission shaft 62. This cylinder 86 opens at its both ends. The innermost end portion of hollow cylinder 86 is formed on its inner peripheral surface with an annular step, and transmission shaft 62 which is supported at its front end portion by the frame plate 48 through ball bearing 87 is received at its rear end portion by ball bearing 88 which is supported by the innermost end portion of cylinder 86 by using the annular step referred to above. The innermost end of hollow cylinder 86 is slightly spaced from the rear end of clutch case 80 and ball bearing 88 is sandwiched between a collar portion 80a formed integrully with clutch case 80 and the hollow cylinder 86. Owing to the structure that bearing 88 for receiving one or rear end portion of transmission shaft 62 is supported by the innermost end portion of hollow cylinder 86 so as to dispose such bearing 88 at a position possibly nearest to the fluid-operated clutch 68 having a relatively large weight, transmission shaft 62 is supported in a very stable manner. Collar portion 80a reduces parts of the transmission in number by omitting a separate collar and also makes it possible to enlarge key 79 shown in FIG. 3 in length for a stable supporting of clutch case 80.

Fluid path 85 in the transmission shaft 62 constitutes a terminal portion of fluid conduit line for supplying and draining clutch-operating fluid for the fluid-operated clutch 68 and is moved to rotate together with the shaft 62. For connecting such fluid path 85 to a fluid path fixed in position, an annular groove 89 communicated to the path 85 is formed on the outer peripheral surface of transmission shaft 62 at a position near to the inner end of hollow cylinder 86. The cylinder 86 has a reduced inner diameter near the groove 89 and seals such groove 89 by the inner peripheral surface of cylinder 86 so as to form an annular fluid chamber 90. To this fluid chamber 90 is communicated a fluid path 91 which is formed in the hollow cylinder 86. The latter fluid path 91 is connected to a control valve for fluid-operated clutch 68, as will be detailed later, so that a rotary joint portion of fluid conduit line for the clutch 68 is offered by the annular fluid chamber 90. A pair of O-rings 92 are disposed between the transmission shaft 62 and hollow cylinder 86 for preventing leakage of fluid from the chamber 90 along the axial direction of shaft 62.

Figure 8:
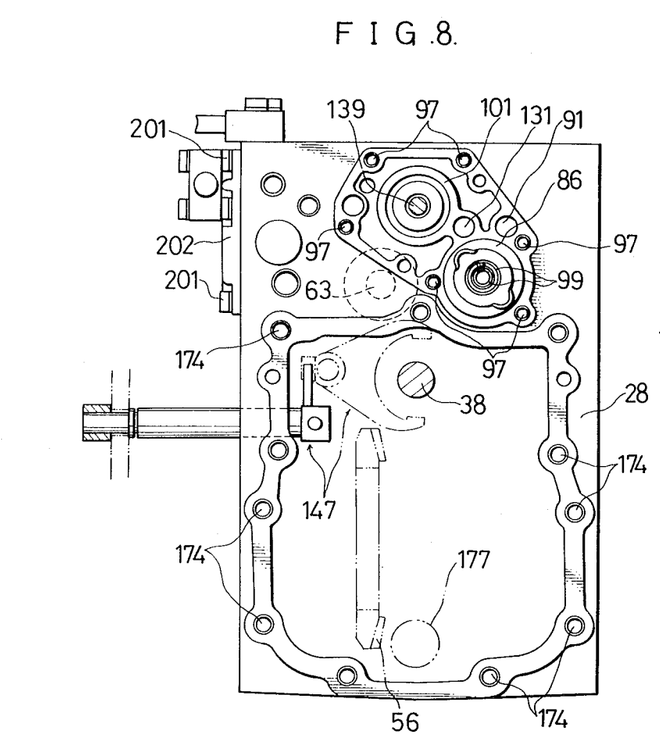
FIG. 8 is a sectional rear view, partially omitted, taken along line VIII—VIII of FIG. 3.

As also clearly shown in FIG. 7, transmission shaft 62 is formed to have a length such that the rear end of such shaft 62 takes a halfway position of hollow cylinder 86 within such cylinder. The brake 69 is fashioned as a frictional brake by employing the hollow cylinder 86 as its brake case in a manner such that it comprises a plurality of frictional plate members 93 which are slidably but non-rotatably supported at their inner peripheral ends by the transmission shaft 62 and a plurality of another frictional plate members 94 which are slidably but non-rotatably supported at their outer peripheral ends by the hollow cylinder 86. In front of the series of frictional plate members 93 and 94, the inner peripheral surface of hollow cylinder 86 is formed with an annular reaction area 95. Behind the series of frictional plate members 93 and 94, a piston 96 is provided in the cylinder 86 in face-to-face relationship with plate members 93 and 94. Rear opening of the hollow cylinder 86 is closed by a cover 98 which is fixedly secured to the rear surface of transmission case 28 by means of fastening bolts (not shown) which are threadingly fitted into threaded bores 97 shown in FIG. 8. Piston 96 may retreat to a position where it engages such cover 98. Rear half of the piston 96 has a hollow cylindrical shape. Within such rear half of piston 96 are arranged a pair of compression coil springs 99 which are received at their base ends by the cover 98 and are engaged at their front ends to the piston 96. Springs 99 thus force the series of frictional plate members 93 and 94 through piston 96 to move toward reaction area 95 so as to cause a frictional engagement of one and another plate members 93 and 94 at between the area 95 and piston 96 resulting in operation of brake 69. For the purpose of releasing the braking of transmission shaft 62 by brake 69, an annular fluid chamber 100 is formed within hollow cylinder 86 in a fashion such that it is faced to an annular step on the outer peripheral surface of piston 96 from the forward direction. This fluid chamber 100 is communicated to the fluid path 91 in the hollow cylinder 86 so that in the operated state of fluid-operated clutch 68 in which fluid is supplied to such clutch 68 under pressure via fluid path 91 the piston 96 is retreated against biasing of springs 99 by fluid pressure whereby braking by the brake 69 is released. As shown in FIGS. 3, 7 and 8, another hollow cylinder 101 which projects into transmission case 28 and supports a rear end portion of transmission shaft 61 is formed, similarly with hollow cylinder 86, integrally with rear wall of the case 28. As can be understood from the arrangement of threaded bores 97 shown in FIG. 8, the cover 98 is sized to close rear openings of both of the hollow cylinder 86 and 101 simultaneously.

Figure 9A:
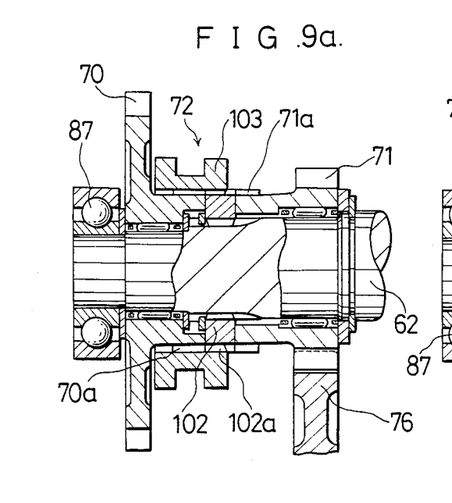
FIG. 9a and FIG. 9b are sectional side views of a part of FIG. 7 but showing another states for illustrating operation of PTO-exchanging clutch shown in FIG. 7.
Figure 9B:
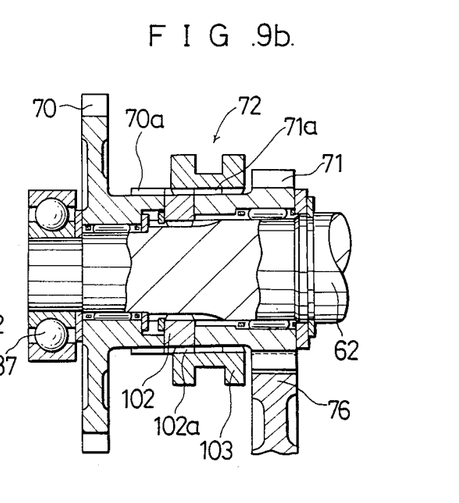

PTO-exchanging clutch 72 will be explained by referring to FIGS. 7 and 9. On the transmission shaft 62 is non-rotatably munted a splined collar 102 between the pair of gears 70 and 71 by spline connection. Boss of each of the gears 70 and 71 has an extension abutting the collar 102. Such extensions of bosses and the splined collar are formed respectively with axially aligned teeth 70a, 71a and 102a. Between gears 70 and 71 is disposed a shifting sleeve 103 which is axially shiftable on and throughout the boss extensions of gears 70 and 71 and splined collar 102. This shifting sleeve 103 is formed on its inner peripheral surface with teeth which may mesh with the teeth 70a, 71a and 102a. Axial length of the shifting sleeve 103 is predetermined so that the sleeve 103 may be placed selectively at a position shown in FIG. 7 where teeth of such sleeve 103 are meshed with all of the teeth 70a, 71a and 102a, a position shown in FIG. 9a where teeth of the sleeve 103 are meshed with teeth 70a and 102a, or a position shown in FIG. 9b where teeth of the sleeve 103 are meshed with teeth 71a and 102a. Accordingly, both of the gears 70 and 71 are connected to transmission shaft 62 at the position of sleeve 103 shown in FIG. 7 so that power is transmitted from transmission shaft 62 toward both of the PTO-shafts 37 and 38. Only the gear 70 is connected to the shaft 62 at the position of sleeve 103 shown in FIG. 9a so that power is transmitted from shaft 62 only toward mid-PTO shaft 37, whereas only the gear 71 is connected to the shaft 62 at the position of sleeve 103 shown in FIG. 9b so that power is transmitted from shaft 62 only toward rear-PTO shaft 38.

Hudraulic System

Figures 10, 11:
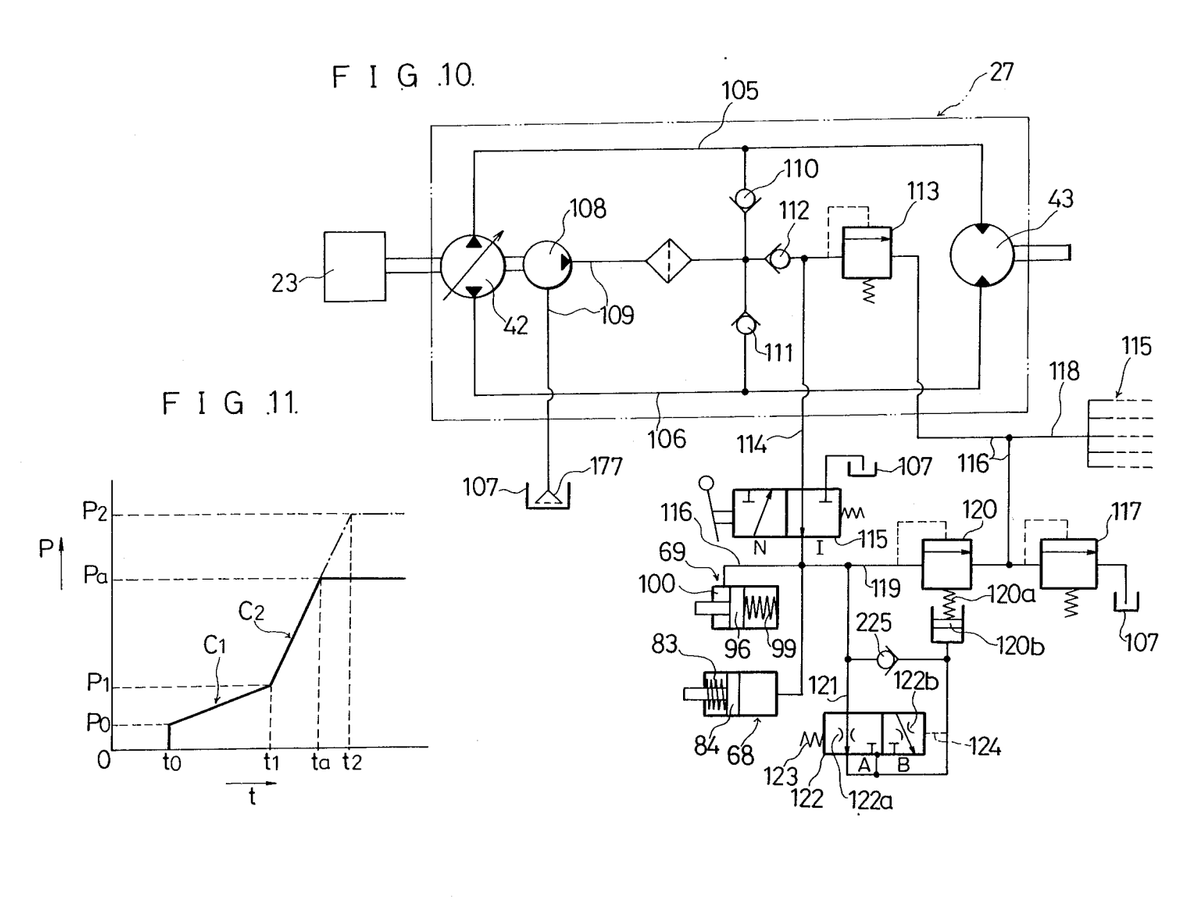
FIG. 10 is a diagram showing fluid circuit of hydraulic system for the hydrostatic transmission and transmission of PTO-system shown in FIG. 3.
FIG. 11 is a schematic graph illustrating an operation of the hydraulic system shown in FIG. 10.

FIG. 10 is a hydraulic circuit diagram which illustrates hydraulic system for fluid-operated clutch 68 and brake 69 associated with the clutch employed in transmission mechanism of PTO-line according to the present invention together with hydraulic system for hydrostatic transmission 27 employed in transmission mechanism for driving the vehicle.

In the hydraulic circuit shown in FIG. 10, hydraulic pump 42 and hydraulic motor 43 of the hydrostatic transmission 27 are connected with each other in a conventional fashion by a pair of fluid pressure-supplying and draining circuits 105 and 106 so that a closed circuit is formed. For supplementing fluid or oil from an oil tank 107 which is formed by a lower portion of transmission case 28, a charge pump 108 is provided which is driven by engine 23 via hydraulic pump 42. Oil charge circuit 109 including such charge pump 108 is connected to the pair of circuits 105 and 106 via a pair of check valves 110 and 111 which permits flow of oil only toward the circuits 105 and 106. For the purpose of determining fluid pressure of oil supplemented to the closed circuit 105, 106, a first relief valve 113 is provided which is connected to charge circuit 109 via check valve 112 permitting flow of oil only from the circuit 109.

Hydraulic system for PTO-system is designed such that supply of clutch-operating fluid to the fluid-operated clutch 68 is made by charge pump 108 for hydrostatic transmission 27. For this end, a fluid supply circuit 114 for the clutch 68 is branched from circuit connecting the check valve 112 and first relief valve 113. In this fluid supply circuit 114 is incorporated a control valve 115 for controlling supply and drainage of fluid for operating the clutch 68. This control valve 115 has an operation position I where fluid is supplied to the clutch 68 and a neutral position N where fluid is drained from the clutch 68 to the tank 107. Fluid chamber 100 for the brake 69 is connected to the fluid supply circuit 114 at the clutch port side of control valve 115 by means of connecting circuit 116.

It is designed that oil drained through the first relief valve 113 is used as lubricant oil for parts to be lubricated 115 such as frictional elements of clutch 68, frictional plate members of brake 69, bearings on transmission shaft 62 and the like. For this end, a second relief valve 117 is incorporated in drain circuit 116 of the first relief valve 113 for establishing pressure of lubricant oil. Lubricant supply circuit 118 which is communicated to parts to be lubricated 115 is branched from a point before the second relief valve 117 in the drain circuit 116.

For establishing fluid pressure applied to the fluid-operated clutch 68, it is designed to use a relief valve of the type which modulates fluid pressure applied to the clutch 68 so as to enlarge such pressure gradually to a predetermined valve. A third relief valve 120 of such pressure-modulating type is incorporated in a circuit 119 which is branched from the fluid supply circuit 114 at the outlet side of control valve 115 and is connected to the second relief valve 117. This third relief valve 120 is fashioned, as well-known from, for example, U.S. Pat. No. 4,148,382 referred to before, such in that base end of spring 120a for establishing fluid pressure is received by a control piston 120b which may advance to a predetermined position and to which fluid pressure at the inlet side of the valve 120 is applied through a throttled fluid path. In the pressure-modulating system shown, a throttle valve 122 including a pair of first and second orifices 122a and 122b is incorporated in a circuit 121 for applying fluid pressure to the control piston 120b. First orifice 122a restricts flow of fluid more largely than second orifice 122b. Throttle valve 122 has a first position A where first orifice 122a is inserted in circuit 121 and a second position B where second orifice 122b is inserted in circuit 121 and is biased by a spring 123 toward the first position A. Pilot circuit 124 is provided which applies fluid pressure of the outlet side of throttle valve 122 to such valve in a direction of displacing the valve 122 to the second position B so that when fluid pressure of the outlet side of throttle valve 122 has been enlarged to a predetermined value enough to overcome the biasing force of spring 123 the valve 122 is displaced to the second position B. For the purpose of releasing fluid pressure applied to the control piston 120b quickly when control valve 115 is displaced from operation position I to neutral position N, a check valve 225 is provided which is connected in parallel with throttle valve 122.

Owing to the provision of pressure-modulating system including the third relief valve 120 set forth above, when control valve 115 is displaced from neutral position N to operation position I fluid pressure applied to the fluid-operated clutch 68 is then enlarged in a manner shown in FIG. 11 which illustrates enlargement of fluid pressure P applied to the clutch 68 with the lapse of time t. At the point to where control valve 115 is displaced to operation position I, fluid pressure P is quickly enlarged to a low initial pressure $P_o$ such as 2 kg/cm² which corresponds to the biasing force of pressure-establishing spring 120a at the most retreated position of control piston 120b. Due to a gradual supply of fluid to the control piston 120b through the first orifice 122a of throttle valve 122, control piston 120b is then gradually advanced so as to enlarge biasing force of spring 120a gradually. Consequently, fluid pressure P is gradually enlarged along a curve $C_1$ shown in FIG. 11. Enlargement of fluid pressure P along the curve $C_1$ continues until pressure P has been enlarged to a value corresponding to the biasing force of spring 123 resulting in displacement of throttle valve 122 to the second position B. As from the point $t_1$ where throttle valve 122 is displaced to the second position B, fluid is supplied to the control piston 120b through the second orifice 122b providing a smaller restriction of flow of such fluid so that control piston 120b is advanced relatively rapidly. Consequently, fluid pressure P is enlarged relatively rapidly along a curve $C_2$ having a relatively large slope shown in FIG. 11. Biasing force of spring 123 for placing the throttle valve 122 at the first position A is predetermined so that fluid pressure $P_1$ obtained at the point of time $t_1$ is such, for example 5 kg/cm², at that initial engagement between frictional elements of the fluid-operated clutch 68 is completed and transmission of torque is initiated.

Accordingly, fluid-operated clutch 68 is brought into its operated state without any shock owing to a gradual enlargement of fluid pressure P along the curves $C_1$ and $C_2$ shown FIG. 11 and, neverthless, in a relatively short period of time owing to a relatively rapid enlargement of fluid pressure P along the curve $C_2$ shown in FIG. 11 at a latter half of clutch-actuating period. In the hydraulic system shown, a further consideration is taken which will be detailed hereinafter.

Maximum relief pressure of the third relief valve 120, namely a fluid pressure which corresponds to the biasing force of spring 120a at the most advanced position of control piston 120b, is such a pressure $P_2$, for example 18 kg/cm², shown in FIG. 11, whereas the first relief valve 113 is fashioned such that it makes pressure-relief operation at a pressure Pa shown in FIG. 11, for example 13 kg/cm², which is lower than the maximum relief pressure $P_2$ of third relief valve 120. It is thus seen that, after the pressure established by the third relief valve 120 has reached the relief pressure Pa of first relief valve 113, fluid pressure Pa determined by the first relief valve 113 is applied to the fluid-operated clutch 68, as shown in FIG. 11. In other words, fluid pressure applied to the clutch 68 in its normal operated state is settled to have a value Pa (relief pressure of the first relief valve 113) lower than the maximum value $P_2$ obtainable by the third relief valve 120 at a point of time $t_2$ until which fluid pressure P might be enlarged along the curve $C_2$ if pressure-modulating system were fashioned such that fluid pressure applied to the clutch 68 is determined only by the third relief valve 120.

Pressure-modulating third relief valve 120 drains little oil to the downstream thereof in a period where fluid pressure is enlarged gradually by such valve 120. The first relief valve 113 which is connected in parallel with the third relief valve 120 does not make pressure-relief operation during a period where fluid pressure established by the third relief valve 120 is lower than the relief pressure of such first relief valve. Accordingly, if the first relief valve 113 were fashioned such that it makes pressure-relief operation at a pressure equal to or larger than the maximum relief pressure $P_2$ of third relief valve 120, then little oil would be supplied to the lubricant supply circuit 118 until the point of time $t_2$ where fluid pressure P enlarged gradually by the third relief valve 120 would reach its maximum value $P_2$. Contrarily to this, the first relief valve 113 shown will make its pressure-relief operation so as to supply lubricant to the circuit 118 as from the point of time $t_a$ where fluid pressure established by the third relief valve 120 reaches a value of the relief pressure Pa of first relief valve 113 so that period in which supply of lubricant oil to the parts to be lubricated 115 is interrupted is made relatively short.

Embodical structures of essential parts of the hydraulic system shown in FIG. 10 will be detailed hereinafter.

Figures 12, 13:
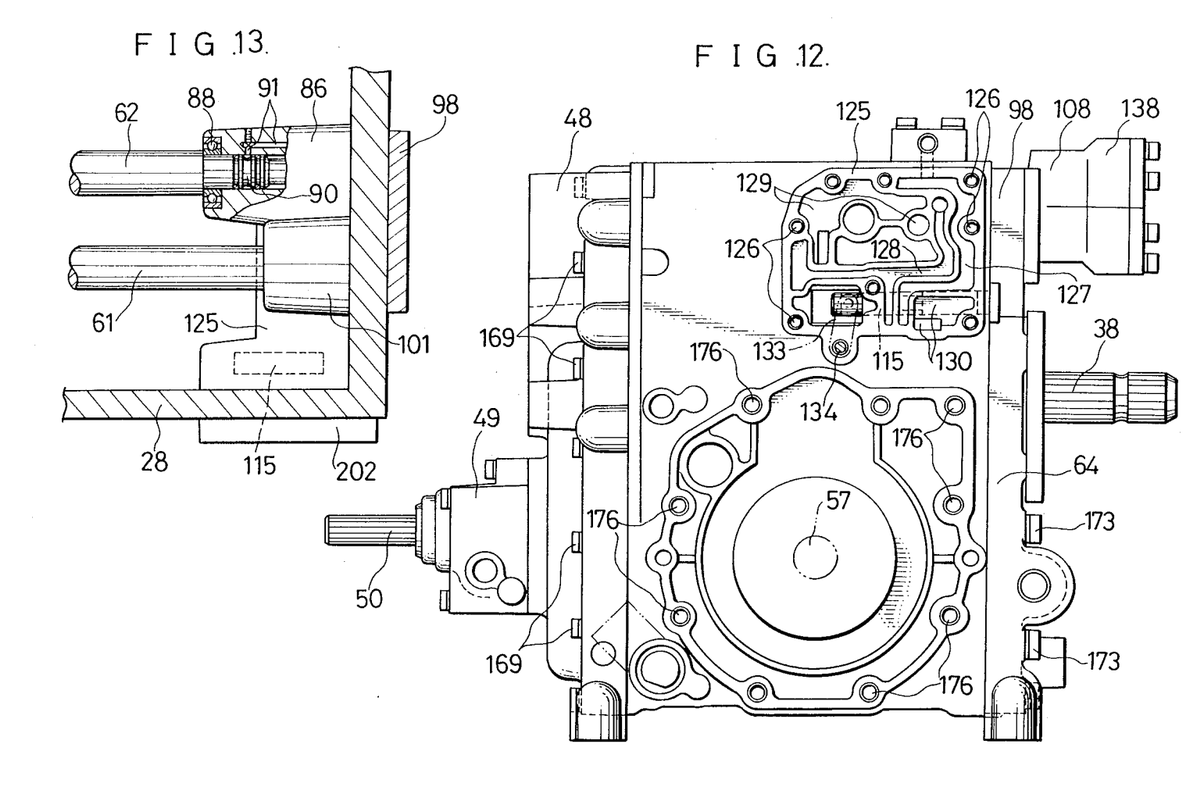
FIG. 12 is a side elevational view, partially omitted, of the transmission case shown in FIGS. 3 and 4 seen along arrows XII—XII of FIG. 4.
FIG. 13 is a cross-sectional plan view, partially omitted, taken along line XII—XII of FIG. 3.

As can be seen from FIG. 13, the transmission shaft 62 is disposed in an offset position along a direction across the transmission case 28. A valve housing 125 which is connected integrally with the inner surface of rear wall of the case 28 as well as the inner surface of one of the side walls of the case nearer to the shaft 62 is projected into the transmission case 28 and is connected integrally with the hollow cylinder 86. As shown in FIG. 12, this valve housing 125 includes fluid pathes which have been formed by molding together with the transmission case 28. These fluid pathes are shaped to open at a side of the case 28 and such opening are closed by a cover 202 shown in FIG. 8 which is secured to a side wall of transmission case 28 by means of fastening bolts 201 threadingly fitted into threaded bores 126. The fluid paths include first and second fluid pathes 127 and 128 which correspond respectively to portions of fluid supply circuit 114 at the inlet and outlet sides of control valve 115 shown in FIG. 10, third fluid path 129 which corresponds to the lubricant supply circuit 118 shown in FIG. 10, and fourth fluid path 130 which is communicated to the inside of transmission case 28 including oil as a tank. The second fluid path 128 is communicated to the fluid path 91 in the hollow cylinder 86 shown in FIGS. 7 and 8, whereas the third path is communicated via a fluid path 132 formed in the hollow cylinder 86 as shown in FIG. 8 to a space 132 shown in FIG. 7 within which the springs 99 are disposed.

As shown in FIG. 12, control valve 115 is constructed by a spool which is provided within the valve housing 125 slidably along a forward and backward direction. Shifter 133 for displacing such spool valve 115 is attached within the housing 125 to a control shaft 134 which is rotatably supported by the valve housing 125. Control valve 115 is displaced selectively to a position corresponding to the operation position I shown in FIG. 10 in which first and second fluid pathes 127 and 128 in the housing 125 are communicated with each other and to other position corresponding to the neutral position N shown in FIG. 10 in which second and fourth fluid pathes 128 and 130 in the housing 125 are communicated with each other. As can be understood from FIG. 13, the hollow cylinder 86 and valve housing 125 are arranged at a corner of upper portion within transmission case 28 in a compact fashion. Because the hollow cylinder 86 and valve housing 125 are connected integrally with each other, fluid path between the control valve 115 and the clutch 68 and brake 69 may be formed without a need of piping.

As shown in FIG. 7, fluid path 85 in the transmission shaft 62 is perforated from the rear end of such shaft 62 and end opening of the path 85 is blocked by threaded plug 135. In the transmission shaft 62 is perforated other fluid path 136 end opening of which is communicated through a central bore 137 in the piston 96 to the space 132 to which lubricant oil is supplied. This another fluid path 136 is communicated to parts to be lubricated on the shaft 62 which parts correspond to the parts to be lubricated 115 shown in FIG. 10.

As shown in FIG. 3, the charge pump 108 is arranged on the rear of transmission case 28 and is connected in one body with hydraulic pump 138 for hydraulic lift mechanism having lift arms 40 shown in FIG. 1. Pump shaft 139 of this charge pump 108 is drivenly connected within the another hollow cylinder 101 to the transmission shaft 61 by means of coupling 140.

Other Parts

As shown in FIG. 3, rear-PTO speed-change gearing 77 comprises two gears 142 and 143 fixedly mounted on the intermediate shaft 63 and another two gears 144 and 145 rotatably mounted on rear-PTO shaft 38. Gears 142 and 143 are constantly meshed with gears 144 and 145, respectively. Between gears 144 and 145 is slidably but non-rotably mounted a shifting sleeve 146 on the rear-PTO shaft 38 for connecting one of the gears 144 and 145 selectively to the shaft 38. The gearing 77 is thus fashioned as a two-speed gearing. Shifting sleeve 146 is shifted by a shift mechanism 146 shown in FIG. 8 which is supported by transmission case 28 and extends through a side wall of the case 28.

Shift mechanism 148 for shifting the shifting sleeve 103 of PTO-exchanging clutch 72 is supported by transmission case 28 and extends through a side wall of the case 28, as shown in FIG. 4.

As shown in FIG. 3, speed-change gearing 53 for stepwisely varying speed of the vehicle comprises the gear 52 and another gear 149 fixedly mounted on the intermediate shaft 46 and two gears 150 and 151 rotatably mounted on the speed-change shaft 47. Gears 52 and 149 are constantly meshed with gears 150 and 151, respectively. Between gears 150 and 151 is slidably but non-rotatably mounted a shifting sleeve 152 on the speed-change shaft 47 for connecting one of the gears 150 and 151 selectively to the shaft 47. The gearing 53 is thus fashioned as a two-speed gearing. Shifting sleeve 152 is shifted by a shift mechanism 153 which is supported by transmission case 28 and extends through a side wall of the case 28.

As shown in FIG. 5, a clutch 154 for selectively eliminating the function of differential gearing 55 is annexed to such gearing 55. This clutch 154 comprises a pin 157 which is attached to a shifting sleeve 158 slidably mounted on a hub portion of differential casing 155. When the sleeve 158 is shifted toward the left as seen in FIG. 5, pin 157 is projected into differential casing 155 so as to connect one of the driven pinions 156 non-rotatably to the casing 155.

As also shown in FIG. 5, each of the left and right disk brakes 58 comprises a pressure plate 159 which operates to push one and another frictional elements respectively supported non-rotatably by the output shaft 57 and transmission case 28 against a reaction area on the case 28 so as to cause an engagement between the frictional elements. In the brake 58 shown, a series of balls 160 which are inserted at a half thereof in cam grooves formed to pressure plate 159 so as to displace such plate 159 toward the frictional elements when the plate 159 is rotated are fitted at another half in grooves formed on the inner surface of boss of internal gear 161 for the planetary gearing 59 so as to bear such balls 160 by the internal gear 161. Sun gear 162 for planetary gearing is formed integrally with output shaft 57, and planetary gears 163 are supported by a carrier 164 fixedly mounted on rear wheel axle 31.

As shown in FIG. 3, front wheel-driving clutch 60 comprises a gear 165 fixedly mounted on the speed-change shaft 47 and another gear 166 rotatably mounted on the output shaft 50. These gears 165 and 166 are meshed with each other. For actuating the clutch 60, shiftable clutch sleeve 167 for selectively connecting gear 166 to the shaft 50 is mounted on such shaft 50. This clutch sleeve 167 is shifted by a shift mechanism 168 shown in FIG. 14 which is supported by the clutch case 49.

Figure 14:
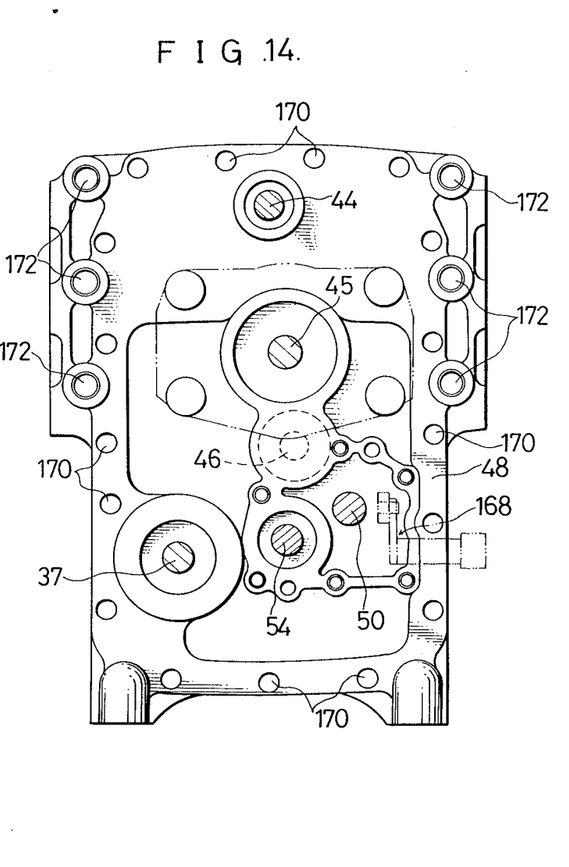
FIG. 14 is a sectional front view, partially omitted, taken along line XIV—XIV of FIG. 3.

The frame plate 48 is fixedly secured to the front of transmission case 28 by means of bolts 169 shown in FIG. 12 which are threadingly fitted into threaded bores 171 of the case 28 shown in FIG. 4 through bores 170 in the plate 48 shown in FIG. 14. As shown in FIG. 14, the frame plate 48 is formed with threaded bores 172 for fastening the hydrostatic transmission 27.

Cover plate 64 shown in FIGS. 3 and 12 is secured to the rear of transmission case 28 by means of bolts 173 which are threadingly fitted in threaded bores 174 in the rear wall of the case 28 shown in FIG. 8. Axle housings 32 shown in FIG. 5 are secured to the transmission case 28 by means of bolts 175 only one of which is shown in FIG. 5. These bolts 175 are threadingly fitted in threaded bores 176 shown in FIG. 12 which are formed in the left and right walls of transmission case 28.

Oil filter 177 shown in FIG. 10 which is provided within oil tank 107 to the base end of the charge circuit 109 is disposed in a lower portion of transmission case 28 which is also used as the oil tank 107, as shown in FIG. 3.

Operation

The working vehicle shown in used for various working purposes such as reaping operation and earth-moving operation. In such use, the vehicle is travelled at a speed controlled by the hydrostatic transmission 27 and speed-change gearing 53 with a selective reverse of travelling direction. When required or preferred, front wheels 21 are also driven to rotate by actuating front wheel-driving clutch 60. By using PTO-exchanging clutch 72, any one of the mid-PTO shaft 37 and rear-PTO shaft 38 or both of them may be driven to rotate so as to drive any one of mower M shown in FIG. 1 and another working implement such as rotary tiller or mower connected to and drawn by the vehicle or both of such mower M and another working implement. Working implement drawn by the vehicle may be driven selectively at a higher speed or at a lower speed by using the rear-PTO speed-change gearing 77.

Before the mechanically operated PTO-exchanging clutch 72 or rear-PTO speed-change gearing 77 is handled, fluid-operated clutch 68 is disengaged by handling the control valve 115. At that time, brake 69 is automatically operated so as to brake the transmission shaft 62 so that inertial rotation of such shaft is terminated quickly. Springs 99 for actuating the brake 69 are predetermined to have a relatively small biasing force so that they do not prevent a shifting operation of shifting sleeve 103 or 146. That is, it is predetermined that transmission shaft 62 is braked with a relatively small braking force enough to permit some rotation of the shaft 62 when teeth of shifting sleeve 103 or 106 are not in the correct angular positions for engagement with teeth to be meshed so that when the sleeve is shifted the correct angular positions of such teeth for engagement are obtained rapidly by some rotation of the shaft and shifting sleeve. Brake 69 also acts in the non-operated state of fluid-operated clutch 68 to prevent an unexpected transmission of power from transmission shaft 61 to transmission shaft 62 which transmission might be caused by a dragging effect of lubricant oil within the clutch 68.

As can be understood from FIGS. 3 and 7, transmission shaft 62 mounting a fluid-operated clutch 68 is reduced in length considerably in comparison with the conventional transmission having a rotary joint portion of fluid conduit line at the outside of transmission case owing to a structure that annular fluid chamber 90 constituting such rotary joint portion is formed within the hollow cylinder 86 which projects into the transmission case 28. Because ball bearing 68 which receives the transmission shaft 62 at one end portion of such shaft at the side of the clutch 68 is supported by the innermost end portion of hollow cylinder 86, transmission shaft 62 mounting thereon a fluid-operated clutch 68 having a relatively large weight is supported in a stable manner. Brake 69 which is constructed by using the hollow cylinder 86 projecting into transmission case 28 as brake case does not require a structure which projects outwardly from an outer surface of the case 28.

Because annular fluid chamber 90 constituting a rotary joint portion of fluid conduit line takes a position as near as possible to the fluid-operated clutch 68, drop of fluid pressure in the fluid-supplying and -draining path 85 within transmission shaft 62 is largely depressed. Drop of fluid pressure between the control valve 115 and annular fluid chamber 90 is also depressed because control valve 115 is disposed within a valve housing 125 which projects inwardly from the inner wall of transmission case and is connected integrally with the hollow cylinder 86 including therein the annular fluid chamber. The hollow cylinder 86 and vave housing 125 eliminate a need of piping between control valve 115 and annular fluid chamber 90 and are arranged at a corner of the inside of transmission case 28 in a compact fashion.

We claim:

1. A power transmission for working vehicles wherein at least one fluid-operated clutch which selectively connects and disconnects a transmission path by selectively continuing and interrupting the input of power to a transmission shaft is mounted on said transmission shaft within a transmission case, said shaft being formed therein with a fluid path for supplying and draining clutch-operating fluid, and wherein a brake is provided to one end portion of said transmission shaft for braking the shaft in the non-operated state of said fluid-operated clutch, characterized in that a hollow cylinder which projects inwardly from an inner wall surface of said transmission case and encloses said one end portion of the transmission shaft is formed integrally with a wall of said transmission case, said one end portion of the transmission shaft having at the outer peripheral surface thereof an annular groove communicated to said fluid path and said annular groove being sealed by the inner peripheral surface of said hollow cylinder so as to form an annular fluid chamber between said shaft and said cylinder, that a fluid path for connecting said fluid-operated clutch to a control valve for controlling supply and drainage of clutch-operating fluid is formed in said hollow cylinder and is communicated to said annular fluid chamber so as to provide a rotary joint portion of a fluid conduit line for said fluid-operated clutch by said annular fluid chamber, and that a braking mechanism of said brake is arranged within said hollow cylinder by employing the cylinder as a brake case therefor, said wall of said transmission case including at an outer end of said hollow cylinder an opening through which assembly of said braking mechanism into said hollow cylinder is permitted from the outside of said transmission case, said opening being closed by a separate cover fixedly secured to said wall.

2. The power transmission for working vehicles as claimed in claim 1, characterized in that bearing means for receiving said transmission shaft at a side of said one end portion is supported by an innermost end portion of said hollow cylinder.

3. The power transmission for working vehicles as claimed in claim 2, characterized in that a clutch case for said fluid-operated clutch is formed with a collar portion which extends on said transmission shaft toward said hollow cylinder, said bearing means being sandwiched between said collar portion and said hollow cylinder.

4. The power transmission for working vehicles as claimed in claim 1, characterized in that said brake comprises a frictional braking means; a piston which is faced to said frictional braking means from a side of said cover; spring means which is received at one end thereof by said cover and is engaged at the other end thereof to said piston, said spring means biasing said frictional braking means through said piston so as to cause a braking operation by said braking means; and a fluid chamber for applying fluid pressure to said piston from a direction opposite to the biasing direction by said spring means, said fluid chamber being connected to said fluid path which is formed in said hollow cylinder for connecting said clutch to said control valve.

5. The power transmission for working vehicles as claimed in claim 1, characterized in that said frictional braking means comprises a plurality of frictional plate members which are slidably but non-rotatably supported at their inner peripheral ends by said transmission shaft and a plurality of another frictional plate members which are slidably but non-rotatably supported at their outer peripheral ends by said hollow cylinder, and that said hollow cylinder is formed at the inner peripheral surface thereof with an annular reaction area which is faced to said piston via the series of said frictional plate members.

6. The power transmission for working vehicles as claimed in claim 1, characterized in that a valve housing which projects inwardly from said inner wall surface of transmission case and is integral with said hollow cylinder is formed integrally with said transmission case, said control valve being included in said valve housing and said fluid path for connecting said annular fluid chamber to said control valve being formed within said valve housing and hollow cylinder.

7. The power transmission for working vehicles as claimed in claim 5, characterized in that said transmission shaft is arranged in an offset position along a direction across said transmission case, said valve housing being connected integrally with said inner wall surface of transmission case as well as with one of two opposite inner wall surfaces of said transmission case perpendicular to said inner wall surface which one is positioned nearer to said transmission shaft than the other of said two opposite inner surfaces.

* * * * *